United States Patent
Taninaka et al.

(10) Patent No.: US 9,765,886 B2
(45) Date of Patent: Sep. 19, 2017

(54) CONTROL SYSTEM AND CONTROL METHOD FOR VEHICLE

(71) Applicant: TOYOTA JIDOSHA KABUSHIKI KAISHA, Toyota-shi, Aichi-ken (JP)

(72) Inventors: Satoshi Taninaka, Nisshin (JP); Hirofumi Nakada, Toyota (JP); Michio Yoshida, Susono (JP); Hiroki Kondo, Miyoshi (JP); Kenji Matsuo, Toyota (JP); Kazuya Ishiizumi, Toyota (JP); Daisuke Inoue, Toyota (JP); Kyohei Suzumura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 14/897,523

(22) PCT Filed: Jun. 12, 2013

(86) PCT No.: PCT/JP2013/066171
§ 371 (c)(1),
(2) Date: Dec. 10, 2015

(87) PCT Pub. No.: WO2014/199457
PCT Pub. Date: Dec. 18, 2014

(65) Prior Publication Data
US 2016/0131255 A1  May 12, 2016

(51) Int. Cl.
*F16D 48/06* (2006.01)
*F16H 61/70* (2006.01)
(Continued)

(52) U.S. Cl.
CPC .......... *F16H 61/70* (2013.01); *F16D 48/06* (2013.01); *F16D 48/062* (2013.01);
(Continued)

(58) Field of Classification Search
CPC ......... Y10T 477/6203; F16H 374/0846; F16H 37/022; F16H 2037/026; F16D 48/062;
(Continued)

(56) References Cited

U.S. PATENT DOCUMENTS 5,944,628 A * 8/1999 Lee ..................... F16H 37/0846
475/210
2002/0094911 A1* 7/2002 Haka ................... F16H 37/0846
477/211
(Continued)

FOREIGN PATENT DOCUMENTS

JP          2941991 B2    8/1999
JP       2002-089706 A    3/2002
(Continued)

*Primary Examiner* — Roger Pang
(74) *Attorney, Agent, or Firm* — Oliff PLC (57) ABSTRACT

A control system and a control method for a vehicle, the vehicle includes an engine, an input shaft, an output shaft, a continuously variable transmission section, a stepped transmission section and a clutch mechanism, and a control device. The continuously variable transmission section and the stepped transmission section are provided between the input shaft and the output shaft. The clutch mechanism is provided in a torque transmission path between the stepped transmission section and drive wheels. The control device is configured to disengage the clutch mechanism in a case where a vehicle speed is at least equal to a specified value and the engine is stopped.

6 Claims, 4 Drawing Sheets (51) Int. Cl.
*F16H 37/02* (2006.01)
*F16H 37/08* (2006.01)

(52) U.S. Cl.
CPC ....... *F16H 37/022* (2013.01); *F16H 37/0846* (2013.01); *F16D 2500/1088* (2013.01); *F16D 2500/306* (2013.01); *F16D 2500/3069* (2013.01); *F16D 2500/30401* (2013.01); *F16D 2500/3111* (2013.01); *F16D 2500/50858* (2013.01); *F16D 2500/7041* (2013.01); *F16H 2037/026* (2013.01); *Y10T 477/6203* (2015.01)

(58) Field of Classification Search
CPC ............. F16D 48/06; F16D 2500/7041; F16D 2500/30401; F16D 2500/3111; F16D 2500/3069; F16D 2500/1088; F16D 2500/306
See application file for complete search history.

(56) References Cited

U.S. PATENT DOCUMENTS

| | | | |
|---|---|---|---|
| 2015/0087452 A1* | 3/2015 | Yoshino | F16H 37/021 474/1 |
| 2015/0107410 A1* | 4/2015 | Yoshida | F16H 37/021 74/664 |
| 2016/0025161 A1* | 1/2016 | Matsuo | F16H 37/022 477/180 |
| 2016/0091090 A1* | 3/2016 | Kimura | F16H 61/662 474/11 |
| 2016/0131256 A1* | 5/2016 | Toyoda | F16H 37/022 701/51 |

FOREIGN PATENT DOCUMENTS

| | | |
|---|---|---|
| JP | 2004-092623 A | 3/2004 |
| JP | 2012-047148 A | 3/2012 |

* cited by examiner

|  | C1 | C2 | C3 | B |
|---|---|---|---|---|
| STARTING | ON | OFF | ON | OFF |
| FORWARD TRAVEL | OFF | ON | (ON) | OFF |
| REVERSE TRAVEL | OFF | OFF | ON | ON |
| FIRST NEUTRAL | OFF | OFF | OFF | OFF |
| SECOND NEUTRAL | OFF | OFF | ON | OFF |
| THIRD NEUTRAL | ON | OFF | OFF | OFF |
| FIRST DISCONNECTED STATE (STEPPED TRANSMISSION SECTION) | OFF | (OFF) | OFF | OFF |
| SECOND DISCONNECTED STATE (STEPPED TRANSMISSION SECTION) | OFF | (OFF) | ON | OFF |
| THIRD DISCONNECTED STATE (STEPPED TRANSMISSION SECTION) | ON | (OFF) | OFF | OFF | though
CONTROL SYSTEM AND CONTROL METHOD FOR VEHICLE

TECHNICAL FIELD

The invention relates to a control device and a control method for a vehicle that includes a clutch for connecting or blocking a torque transmission path between a transmission gear device and drive wheels.

BACKGROUND ART

It has widely been known to configure that torque transmitted from drive wheels of a vehicle is not transmitted to a transmission gear device. For example, a vehicle that includes: an auxiliary transmission including plural transmission paths with different transmission gear ratios; and a clutch for connecting or blocking any of the transmission paths of an auxiliary transmission and a toroidal continuously variable transmission, in a torque transmission path between the toroidal continuously variable transmission and drive wheels is described in Japanese Patent Application Publication No. 2002-89706 (JP 2002-89706 A).

In addition, a control device described in JP 2002-89706 A is configured to actuate the clutch at a time that an internal combustion engine as a power source is stopped, control the auxiliary transmission to a neutral position regardless of a transmission gear step selected by a driver, and block transmission of torque between the toroidal continuously variable transmission and the drive wheels. According to a configuration described in JP 2002-89706 A, the transmission of the torque from the drive wheels to the toroidal continuously variable transmission is blocked in a state where the internal combustion engine is stopped. Thus, the toroidal continuously variable transmission in an unlubricated state can be prevented from being actuated by the torque from the drive wheels when the vehicle is towed. Therefore, durability of the toroidal continuously variable transmission can be improved.

Meanwhile, in recent years, due to requests of improved fuel economy, reduced exhaust gas of vehicles, and the like, types of control referred to as so-called idle stop control, stop and start control (hereinafter described as "S&S control"), and the like, which are control for stopping an internal combustion engine when the vehicle stops or a specified condition has been established during a travel, have been executed. It has been known to execute the S&S control, for example, in a case where the vehicle stops by following a traffic signal, in a case where depression of an accelerator pedal is cancelled by a driver and a vehicle speed is reduced, in a case where the depression of the accelerator pedal is cancelled in a state where the vehicle runs at a certain vehicle speed or higher, in a case where the driver depresses a brake pedal and the vehicle speed is thus reduced, and the like. That is, it is configured that, even when a main switch is in an ON state, the control for stopping the driving internal combustion engine is executed by establishment of the specified condition. In addition, the internal combustion engine is temporarily stopped by the S&S control. Thus, the internal combustion engine is possibly restarted thereafter by an acceleration request or the like.

In summary, the S&S control is control for stopping fuel supply to the internal combustion engine, stopping ignition of a gasoline engine, and the like. Accordingly, the internal combustion engine itself can be rotated under the S&S control. However, the transmission of the torque between the internal combustion engine and the drive wheels is blocked. It is because power is lost when the internal combustion engine is rotated during the S&S control, because drive torque fluctuates significantly when the internal combustion engine is restarted after an automatic stop, because a travel state of the vehicle and an operation state of the internal combustion engine differ when the S&S control is executed during the travel, and the like. For example, a clutch that is provided on an input side of the transmission gear device is disengaged, so as to block the transmission of the torque between the internal combustion engine and the drive wheels. The clutch only has to be provided in the torque transmission path between the internal combustion engine and the drive wheels, and may be provided on either the input side or an output side of the transmission gear device. In association with the stop of the internal combustion engine by the S&S control, various suggestions have conventionally been made for controlling the clutch.

However, it is not described in JP 2002-89706 A that the auxiliary transmission is brought into the neutral position when the main switch is in the ON state. Thus, there is still room for improvement of the control for engaging or disengaging the clutch in a state where the vehicle speed approximates zero and the internal combustion engine is stopped by bringing the auxiliary transmission into a neutral state in order to prepare for a case where the vehicle is towed and by bringing the auxiliary transmission into the neutral state in order to prepare for a restart of the internal combustion engine by the S&S control.

By the way, a vehicle, in which a continuously variable transmission section for continuously varying a transmission gear ratio and a stepped transmission section having one or plural fixed transmission gear ratios are provided in parallel, has been known. In this vehicle, plural torque transmission paths that stretch from a power source to the drive wheels are provided, and plural clutches for switching these transmission paths are provided. The torque transmission path that stretches from the power source to the drive wheel is configured to be switched to run through the transmission path including the continuously variable transmission section or the transmission path including the stepped transmission section by combinations of engaged states or disengaged states of the plural clutches. That is, it is configured to set connection or blockage of the torque transmission path, which regards to the torque transmission path between the power source and the drive wheels, the torque transmission path between the continuously variable transmission section and the power source or the drive wheels, the torque transmission path between the stepped transmission section and the power source or the drive wheels, and the like, by the combinations of the engaged states or the disengaged state of the plural clutches.

The configuration described in above-described JP 2002-89706 A is a structure in which the torque output from the toroidal continuously variable transmission is input to the auxiliary transmission, that is, a configuration in which the continuously variable transmission section and the stepped transmission section are arranged in series. Accordingly, in the vehicle including the transmission gear device in which those stepped transmission section and continuously variable transmission section are provided in parallel, there is still room for improvement of the control for bringing the transmission gear device into the neutral state by engaging or disengaging the clutches for switching the above-described transmission path when the control for stopping the internal combustion engine is executed.

SUMMARY OF THE INVENTION

The invention has been made by paying attention to the above technical problem and therefore has a purpose of providing a control device and a control method for a vehicle, in which a transmission path including a stepped transmission section and a transmission path including a continuously variable transmission section are arranged in parallel and a clutch mechanism for switching the transmission path is provided, in order to control actuation of a clutch mechanism in accordance with a stop state or a travel state of the vehicle when an engine is stopped.

In order to achieve the above purpose, the invention is a control device for a vehicle that includes, between an input shaft, to which torque output from an engine is input, and an output shaft for outputting the torque: a continuously variable transmission section for continuously varying a transmission gear ratio; a stepped transmission section provided in parallel with the continuously variable transmission section and capable of setting a transmission gear ratio that cannot be set by said continuously variable transmission section; and a clutch mechanism provided in a torque transmission path between the stepped transmission section and drive wheels, the control device characterized in that it is configured to disengage the clutch mechanism in a case where a vehicle speed is at least equal to a specified value and in a case where the engine is stopped.

The invention is the control device for a vehicle characterized in that, in the above invention, it is configured to disengage the clutch mechanism in a case where the vehicle speed is lower than the specified value and in a case where the engine is stopped due to an engine stall or ignition OFF.

The invention is the control device for a vehicle characterized in that, in the above invention, it is configured to maintain engagement of the clutch mechanism in a case where the vehicle speed is lower than the specified value and in a case where the engine is stopped due to execution of stop and start control.

The invention is a control method for a vehicle that includes, between an input shaft, to which torque output from an engine is input, and an output shaft for outputting the torque: a continuously variable transmission section for continuously varying a transmission gear ratio; a stepped transmission section provided in parallel with the continuously variable transmission section and capable of setting a transmission gear ratio that cannot be set by said continuously variable transmission section; and a clutch mechanism provided in a torque transmission path between the stepped transmission section and drive wheels, the control method characterized by disengaging the clutch mechanism in a case where it is determined that a vehicle speed is at least equal to a specified value and in a case where the engine is stopped.

The invention is the control method for a vehicle in the above invention characterized by disengaging the clutch mechanism in a case where it is determined that the vehicle speed is lower than the specified value and in a case where it is determined that the engine is stopped due to an engine stall.

The invention is the control method for a vehicle in the above invention characterized by maintaining engagement of the clutch mechanism in a case where it is determined that the vehicle speed is lower than the specified value and in a case where it is determined that the engine is stopped due to execution of stop and start control.

Accordingly, according to the invention, a disengaging operation or maintenance of the engagement of the clutch mechanism that is provided between the stepped transmission section and the output shaft can be controlled in accordance with a stop state or a travel state of the vehicle. Thus, during a travel of the vehicle, in particular, during free running, coasting after the engine stall, or the like, a torque transmission path between the stepped transmission section including a gear train and the output shaft can be blocked by disengaging the clutch mechanism. Accordingly, rotation of a gear mechanism that constitutes the stepped transmission section by the output shaft can be prevented. Thus, rotation loss by the stepped transmission section can be suppressed. Furthermore, transmission of so-called reverse input torque from the drive wheels to the stepped transmission section can be prevented during a speed reduction. Accordingly, the stepped transmission section that is brought into an unlubricated state by a stop of the engine can be prevented from being actuated by the reverse input torque. Thus, durability of the stepped transmission section can be improved. Therefore, the durability of the stepped transmission section can be improved by reducing torque that is unnecessarily applied to the stepped transmission section and suppressing unnecessary rotation thereof. In addition, transmission of the reverse input torque to the engine via the stepped transmission section can be prevented.

Furthermore, according to the invention, a transmission path including the stepped transmission section and a transmission path including a continuously variable transmission section are provided in parallel. Accordingly, in a case where the continuously variable transmission section and the drive wheels are mechanically connected and the vehicle is accelerated again in a state where the vehicle speed is high to a certain degree even when the stepped transmission section is mechanically disconnected from the drive wheels, the vehicle can be accelerated by using the transmission path including the continuously variable transmission section.

In addition, for example, in the case of the engine stall or in a case where an ignition switch is in an OFF state, a situation where the vehicle is towed is considered. Thus, the clutch mechanism can be disengaged to prepare for a towed state. That is, according to the invention, it is configured to be able to set a neutral state that includes a state where the clutch mechanism is disengaged. Accordingly, since the engine is stopped during towing of the vehicle, application of the torque from the drive wheels to the stepped transmission section that is brought into the unlubricated state can be prevented. Thus, the torque that is unnecessarily applied to the stepped transmission section can be reduced, and the unnecessary rotation of the stepped transmission section can be suppressed. Therefore, the durability of the stepped transmission section can be improved.

Furthermore, according to the invention, in a case where the engine is stopped due to execution of the stop and start control, the engagement of the clutch mechanism can be maintained during the stop of the vehicle or during the travel at a relatively low vehicle speed. For example, in a case where the stop and start control is executed, the torque transmission path between the stepped transmission section and the output shaft can continuously be connected by maintaining the engagement of the clutch mechanism. Accordingly, in a case where relatively high drive power is required after the engine is stopped by the stop and start control, such as a case where the vehicle is accelerated again from a low vehicle speed state, delayed generation of the drive power in the drive wheels that is based on an accelerator operation amount, the vehicle speed, and the like and follows target requested power can be prevented. In addition, in a case where the transmission gear ratio by the stepped transmission section is set to be higher than a transmission gear ratio by the continuously variable transmission section, a torque transmission path between the engine and the drive wheels can be switched in accordance with the travel state or the stop state of the vehicle.

MODE FOR CARRYING OUT THE INVENTION

A description will hereinafter be made on the basis of a specified example of the invention. A vehicle as a target of the invention is configured that S&S control is executed and an internal combustion engine as a power source is stopped in a case where a specified condition is established during a stop or during a travel. That is, it is configured to execute the S&S control in accordance with a stop state or a travel state when an ignition switch as a main switch of the vehicle is in an ON state. Accordingly, the control device for a vehicle according to the invention is configured to control actuation of a disconnect mechanism for connecting or blocking a torque transmission path between the internal combustion engine and drive wheels in accordance with the travel state or the stop state of the vehicle in a state where the internal combustion engine is stopped.

Furthermore, the vehicle as the target of the invention includes a transmission gear device, in which a continuously variable transmission section for continuously varying a transmission gear ratio and a stepped transmission section having one or plural specified transmission gear ratios are provided in parallel, between an input shaft, to which power output from the power source is input, and an output shaft for outputting the power. In particular, the disconnect mechanism is provided between the transmission gear device and the drive wheels in this specified example. Accordingly, the vehicle includes: a clutch mechanism for connecting or blocking a torque transmission path between the stepped transmission section and the drive wheels; and a clutch mechanism for connecting or blocking a torque transmission path between the continuously variable transmission section and the drive wheels.

Figure 1:
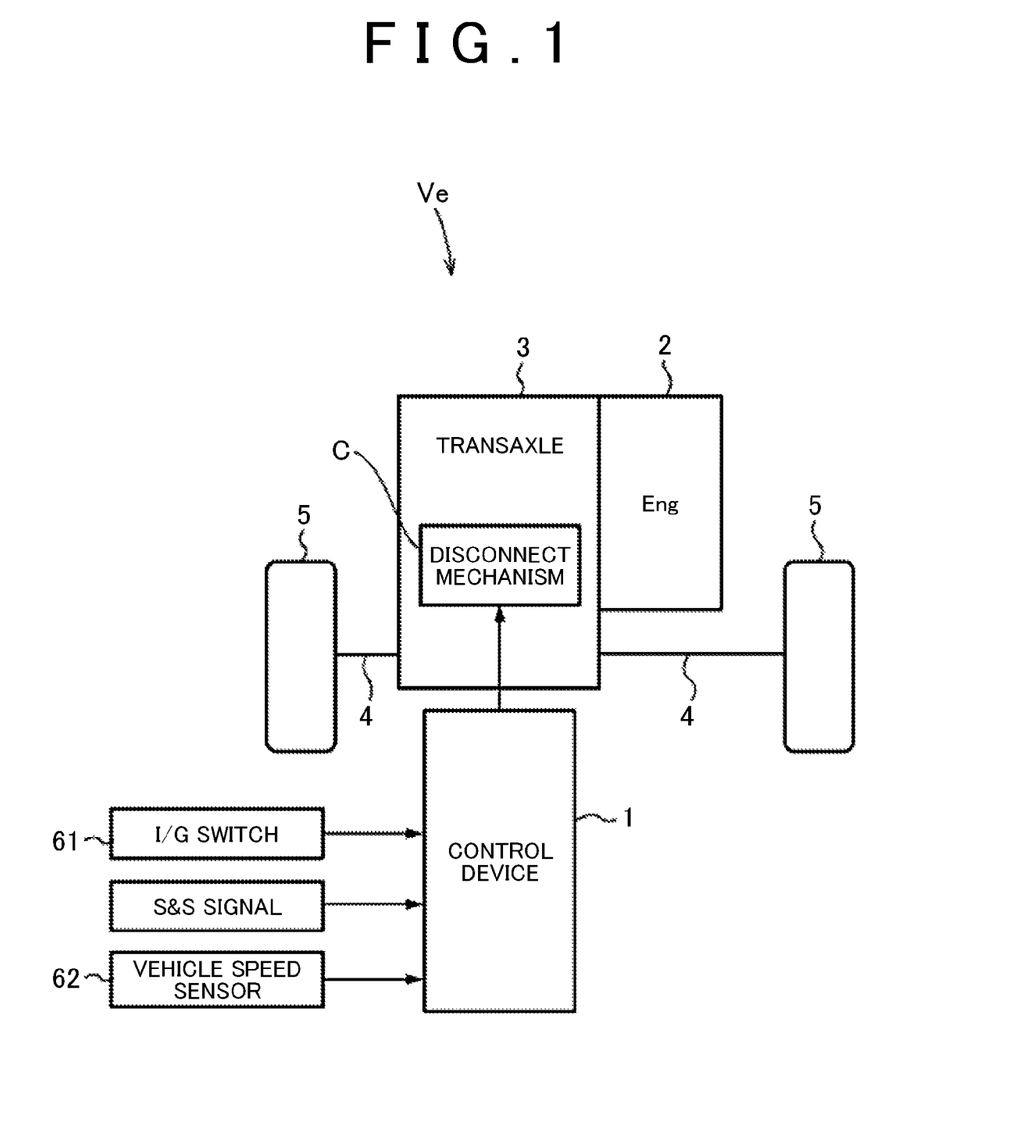
FIG. 1 is a block diagram of one example of a control device for a vehicle according to the invention.

FIG. 1 is a block diagram for schematically showing the control device for a vehicle in this specified example and the vehicle in which the control device is mounted. A vehicle Ve in this specified example includes a transaxle 3 provided with a disconnect mechanism C for blocking a torque transmission path that stretches from an engine 2 as the power source to drive wheels 5 integrally rotating with an axle 4. The disconnect mechanism C is constructed of the clutch mechanisms and is configured that actuation thereof is controlled by a control device 1.

The control device 1 is included in an electronic control unit (ECU) that is a controller mounted in the vehicle Ve, and is configured by including a central processing unit (CPU), memories (a RAM and a ROM), and a microcomputer having an input/output interface as a main component.

In addition, it is configured that signals from various sensors are input to the control device 1. For example, the signals input to the control device 1 include: an ignition signal indicating that an ignition switch 61 as a main switch of the vehicle Ve is in an ON state (ignition ON) or an OFF state (ignition OFF); an S&S signal by which it can be determined that the S&S control is currently executed; and detection signals of a vehicle speed V detected by a vehicle speed sensor 62, a speed of the engine 2, a rotational speed of the axle 4, an accelerator operation amount Acc based on an operation of an accelerator pedal, an operation of a brake pedal, and the like.

Furthermore, the memories of the control device 1 store various types of data in addition to various control programs and are configured to execute various types of computation processing. Accordingly, the control device 1 is configured to execute various types of the computation processing on the basis of the input signals and the stored data and to output a command signal for executing various types of control in accordance with a result of the computation processing. In this specified example, the control device 1 is configured to output a command signal for controlling actuation of the disconnect mechanism C in accordance with the travel state or the stop state of the vehicle Ve.

Figure 2:
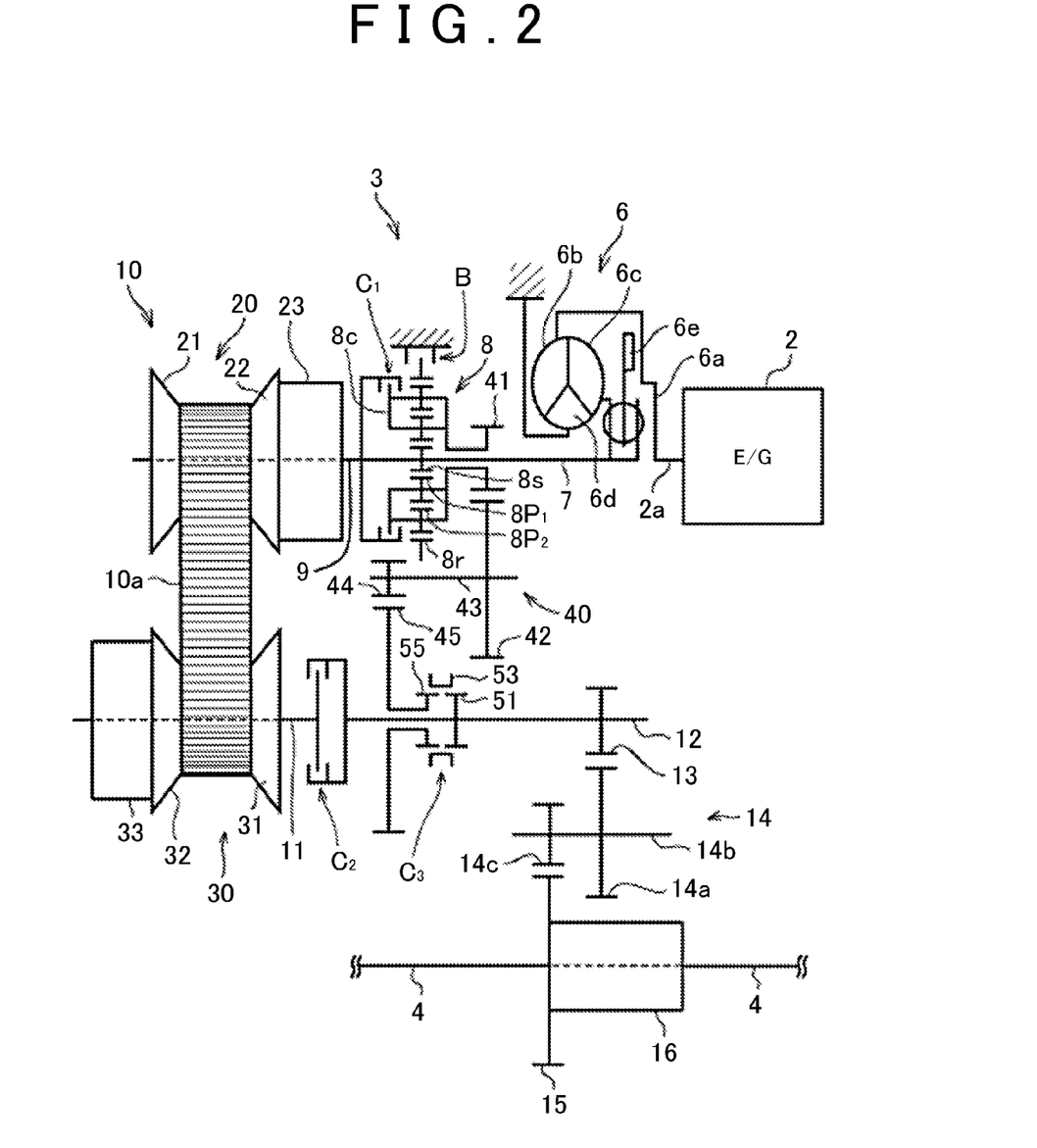
FIG. 2 is a skeletal view for illustrating one example of a powertrain in which a stepped transmission section and a continuously variable transmission section in the invention are arranged in parallel.

Here, a description will be made on one example of a powertrain provided in the vehicle Ve with reference to FIG. 2. FIG. 2 schematically shows the torque transmission path that stretches from the engine 2 to the axle 4 via the transaxle 3. The engine 2 is any of a gasoline engine, a diesel engine, a hydrogen gas engine, a natural gas engine, and the like, and is the internal combustion engine that combusts fuel to output the power. In particular, the engine 2 is configured that a fuel consumption amount or a fuel consumption rate is changed in accordance with the engine speed and output torque (engine torque). In addition, the engine 2 is configured that the power to be output is controlled on the basis of an output operation, such as the operation of the accelerator pedal by a driver. Accordingly, the engine 2 may be subjected to drive control, such as fuel injection control, ignition control, and intake air amount adjustment control, by an electronic control unit for engine control, which is not shown. For example, in a case of the travel with an emphasis on the fuel economy, the engine speed and the engine torque are separately controlled. In addition, in a case where the engine 2 is the gasoline engine, an intake air amount is controlled by controlling actuation of an electronic throttle valve, which is not shown. In this way, the engine torque is controlled. Meanwhile, in a case where the engine 2 is the diesel engine, the engine torque is controlled by a fuel injection amount.

In addition, this vehicle Ve includes a lubrication device, which is not shown, for supplying a lubricant such as oil to portions requiring lubrication. The lubrication device is a supply source of the lubrication oil and includes an oil pump for discharging the lubrication oil when being driven. The oil pump includes a pump that is configured to be driven by torque of a crankshaft 2a when the engine 2 is driven. Accordingly, when the engine 2 is stopped, the oil pump is stopped. Thus, an unlubricated state where the lubrication oil is not supplied to the portions that require the lubrication due to contact of metals, such as a gear mechanism, possibly occurs.

Furthermore, a torque converter 6 with a lockup clutch is coupled to the crankshaft 2a. The torque converter 6 has a conventionally widely-known configuration as a fluid transmission device. A turbine runner 6c is arranged to face a pump impeller 6b that is integrated with a front cover 6a, and a stator 6d held via a one-way clutch, which is not shown, is arranged between these pump impeller 6b and turbine runner 6c. That is, the front cover 6a is coupled to the crankshaft 2a, and the front cover 6a and the pump impeller 6b integrally rotate with the crankshaft 2a. In addition, the turbine runner 6c is coupled to an input shaft 7, and it is configured that the turbine runner 6c and the input shaft 7 integrally rotate with each other. Furthermore, a lockup clutch 6e that integrally rotates with the turbine runner 6c is arranged to face an inner surface of the front cover 6a. It should be noted that the one-way clutch is provided between the stator 6d and a fixed member such as a casing.

A forward/reverse travel switching mechanism 8 is arranged on a same axis as the input shaft 7. The forward/reverse travel switching mechanism 8 is a mechanism for switching between a forward travel state where the torque transmitted from the input shaft 7 is transmitted without changing a rotational direction thereof and a reverse travel state where the torque transmitted from the input shaft 7 is transmitted by reversing the rotational direction thereof. The forward/reverse travel switching mechanism 8 is constructed of a so-called differential mechanism in which three rotation elements exert a differential action among them. That is, the various differential mechanisms of this type have conventionally been known, and any differential mechanism can be adopted for the forward/reverse travel switching mechanism in the invention. In this specified example, as shown in FIG. 2, the forward/reverse travel switching mechanism 8 is constructed of a planetary gear unit of a double pinion type.

More specifically, the forward/reverse travel switching mechanism 8 includes: a sun gear 8s as an outer tooth gear; a ring gear 8r as an inner tooth gear that is coaxially arranged with the sun gear 8s; a first pinion gear $8P_1$ that meshes with the sun gear 8s; a second pinion gear $8P_2$ that meshes with the first pinion gear $8P_1$ and the ring gear 8r; and a carrier 8c that holds these pinion gears $8P_1$ and $8P_2$ in a manner to allow rotation and revolution thereof. The sun gear 8s is configured to integrally rotate with the input shaft 7 and constitutes an input element in the planetary gear unit. In addition, a brake mechanism B for selectively stopping rotation of the ring gear 8r is provided. That is, the ring gear 8r constitutes a reaction force element in the planetary gear unit. The brake mechanism B is provided between the ring gear 8r and the fixed member such as the casing and can be constructed of a friction-type brake or a meshing-type brake, such as a multiplate brake.

In addition, the carrier 8c is configured to integrally rotate with a drive gear 41 of a stepped transmission section 40, which will be described below, and constitutes an output element in the planetary gear unit. Furthermore, a first clutch mechanism $C_1$ for selectively coupling the carrier 8c and the sun gear 8s is provided between the carrier 8c and the sun gear 8s. The first clutch mechanism $C_1$ is configured to directly transmit the torque of the input shaft 7 to the carrier 8c as the output element. In other words, the first clutch mechanism $C_1$ is a mechanism, actuation of which is controlled by the control device 1, and that selectively performs transmission or blockage of the torque between the input shaft 7 and the stepped transmission section 40. That is, the first clutch mechanism $C_1$ is included in the disconnect mechanism C in the invention. For example, when the first clutch mechanism $C_1$ couples the carrier 8c and the sun gear 8s, the entire forward/reverse travel switching mechanism 8, which is constructed of the planetary gear unit, rotates integrally.

In addition, the first clutch mechanism $C_1$ in this specified example is constructed of a wet-type or dry-type friction clutch, with which transmission torque capacity is gradually increased or decreased in accordance with an engagement force. More specifically, the first clutch mechanism $C_1$ includes a hydraulic actuator connected to a hydraulic circuit, which is not shown, and is configured to be actuated by changing hydraulic pressure of the hydraulic actuator. The engagement force is changed by increasing or decreasing the hydraulic pressure (engagement pressure) of the first clutch mechanism $C_1$. Accordingly, the control device 1 is configured to control a change in the transmission torque capacity of the first clutch mechanism $C_1$ by controlling a change in the hydraulic pressure. Furthermore, in the hydraulic actuator that is provided in the first clutch mechanism $C_1$, a hydraulic pressure chamber may be connected to an accumulator, which is not shown. In this case, the first clutch mechanism $C_1$ is configured to be actuated when being supplied with the hydraulic pressure that is accumulated in the accumulator.

A continuously variable transmission section 10, to which the torque of the input shaft 7 is input, is constructed of a belt-type continuously variable transmission that has conventionally been known. The continuously variable transmission section 10 includes: a primary shaft 9 and a secondary shaft 11 provided in parallel; a primary pulley 20 as a drive-side member that integrally rotates with the primary shaft 9; a secondary pulley 30 as a driven-side member that integrally rotates with the secondary shaft 11; and a belt 10a that is wound around these pulleys 20, 30. Accordingly, each of the pulleys 20, 30 is configured to change a winding radius of the belt 10a to be increased or decreased by changing a width of a groove, on which the belt 10a is wound, to be widened or narrowed. That is, the continuously variable transmission section 10 is configured to vary a transmission gear ratio by the continuously variable transmission section 10 in continuous and stepless manners by changing the width of the groove, on which the belt 10a is wound.

More specifically, the primary pulley 20 is configured to integrally rotate with the primary shaft 9 that is coaxially arranged with the input shaft 7, and is arranged on an opposite side of the engine 2 with the forward/reverse travel switching mechanism 8 being interposed therebetween in an axial direction. In this specified example, the input shaft 7 is configured to integrally rotate with the primary shaft 9. That is, the primary shaft 9 is coupled to integrally rotate with the sun gear 8s of the forward/reverse travel switching mechanism 8. In addition, the primary pulley 20 includes: a fixed sheave 21 that is integrated with the primary shaft 9; and a movable sheave 22 that is fitted to the primary shaft 9 in a movable manner in the axial direction so as to approach or separate from the fixed sheave 21. Furthermore, a thrust application mechanism 23 that applies thrust to the movable sheave 22 so as to cause movement thereof to the fixed sheave 21 side is provided. The thrust application mechanism 23 is constructed of an electric actuator, a hydraulic actuator, or the like and is configured to generate the thrust that is applied to the movable sheave 22. The thrust application mechanism 23 is arranged on a back surface side of the movable sheave 22, that is, on an opposite side of the fixed sheave 21 with the movable sheave 22 being interposed therebetween in the axial direction. It should be noted that, in this specified example, the primary shaft 9 is possibly described and explained as the input shaft 7 in the following description because the primary shaft 9 is configured to integrally rotate with the input shaft 7.

Furthermore, the secondary pulley 30 is arranged such that a rotation center axis of the secondary pulley 30 is parallel with a rotation center axis of the primary pulley 20. More specifically, the secondary pulley 30 includes: a fixed sheave 31 that is integrated with the secondary shaft 11; and a movable sheave 32 that is configured to be movable in the axial direction with respect to the secondary shaft 11 so as to approach or separate from the fixed sheave 31. Moreover, a thrust application mechanism 33 that applies the thrust to the movable sheave 32 so as to cause movement thereof to the fixed sheave 31 side is provided. The thrust application mechanism 33 is constructed of a torque cam mechanism, a spring mechanism, an electric actuator, a hydraulic actuator, or the like, and is configured to generate the axial thrust that is applied to the movable sheave 32. In addition, the thrust application mechanism 33 is arranged on a back surface side of the movable sheave 32 in the axial direction, that is, on an opposite side of the fixed sheave 31 with the movable sheave 32 being interposed therebetween. With the thrust applied from the thrust application mechanism 33, the movable sheave 32 is configured to generate a force for holding the belt 10a between the movable sheave 32 and the fixed sheave 31. It is configured to increase a friction force between the secondary pulley 30 and the belt 10a by increasing the holding force. Accordingly, it is configured that, due to the friction force, the torque of the primary pulley 20 is transmitted to the secondary pulley 30 via the belt 10a and the torque is further transmitted to the secondary shaft 11 that integrally rotates with the secondary pulley 30.

In this specified example, a second clutch mechanism $C_2$ that selectively couples the secondary shaft 11 and an output shaft 12 is provided between the secondary pulley 30 and the output shaft 12. That is, the second clutch mechanism $C_2$ can selectively perform the transmission or the blockage of the torque between the continuously variable transmission section 10 and the output shaft 12. The second clutch mechanism $C_2$ is configured to directly transmit the torque of the secondary shaft 11 to the output shaft 12. Accordingly, actuation of the second clutch mechanism $C_2$ is controlled by the control device 1, and the second clutch mechanism $C_2$ is included in the disconnect mechanism in the invention.

In addition, the second clutch mechanism $C_2$ in this specified example is constructed of a wet-type or dry-type friction clutch, with which transmission torque capacity is gradually increased or decreased in accordance with the engagement force. More specifically, the second clutch mechanism $C_2$ includes a hydraulic actuator connected to a hydraulic circuit, which is not shown, and is configured to be actuated by changing hydraulic pressure of the hydraulic actuator. The engagement force is changed by increasing or decreasing the hydraulic pressure (the engagement pressure) of the second clutch mechanism $C_2$. Accordingly, the control device 1 is configured to control a change in the transmission torque capacity of the second clutch mechanism $C_2$ by controlling a change in the hydraulic pressure. It should be noted that, in the hydraulic actuator that is provided in the second clutch mechanism $C_2$, a hydraulic pressure chamber may be connected to an accumulator, which is not shown. In this case, the second clutch mechanism $C_2$ is configured to be actuated when being supplied with the hydraulic pressure that is accumulated in the accumulator.

Here, a description will be made on the stepped transmission section 40 that is provided between the input shaft 7 and the output shaft 12 and has one or plural fixed transmission gear ratios. The stepped transmission section in the invention is a speed reduction mechanism for setting a higher fixed transmission gear ratio than a maximum transmission gear ratio that can be set by the continuously variable transmission section 10, or a speed increase mechanism for setting a lower fixed transmission gear ratio than a minimum transmission gear ratio that can be set by the continuously variable transmission section 10. That is, the invention includes the stepped transmission section capable of setting the fixed transmission gear ratio that cannot be set by the continuously variable transmission section 10. As shown in FIG. 2, the stepped transmission section 40 of this specified example is constructed of the speed reduction mechanism, and is provided with a counter shaft 43 for aligning a rotational direction of the drive gear 41 as a rotation member on a drive side with a rotational direction of a driven gear 45 as a rotation member on a driven side between the input shaft 7 and the output shaft 12. The drive gear 41 is configured to integrally rotate with the carrier 8c as the output element of the forward/reverse travel switching mechanism 8 and always meshes with a counter driven gear 42 that is provided on the counter shaft 43. In addition, the counter driven gear 42 is formed to have a larger diameter than the drive gear 41. That is, the number of tooth of the counter driven gear 42 is larger than the number of tooth of the drive gear 41. Accordingly, in a case where the torque is transmitted from the drive gear 41 toward the counter driven gear 42, it is configured to generate a speed reducing action by a first gear pair that includes the drive gear 41 and the counter driven gear 42.

In addition, the counter shaft 43 includes a counter drive gear 44 that is formed to have a smaller diameter than the counter driven gear 42. The counter drive gear 44 always meshes with the driven gear 45 and is formed to have a smaller diameter than the driven gear 45. That is, the number of tooth of the counter drive gear 44 is smaller than the number of tooth of the driven gear 45. Accordingly, in a case where the torque is transmitted from the counter drive gear 44 toward the driven gear 45, it is configured to generate the speed reducing action by a second gear pair that includes the counter drive gear 44 and the driven gear 45. In addition, the driven gear 45 is fitted to an outer circumferential side of the output shaft 12 in a manner capable of relatively rotating with the output shaft 12, and is configured to integrally rotate with the output shaft 12 by being coupled thereto by a third clutch mechanism $C_3$, which will be described below. That is, the stepped transmission section 40 is configured that the rotational direction of the drive gear 41 is aligned with a rotational direction of the output shaft 12. Accordingly, the fixed transmission gear ratio by the stepped transmission section 40 has a value that is obtained by multiplying a transmission gear ratio (a gear ratio) between the drive gear 41 and the counter driven gear 42 by a transmission gear ratio (a gear ratio) between the counter drive gear 44 and the driven gear 45. In addition, the fixed transmission gear ratio by the stepped transmission section 40, which is shown in FIG. 2, is set to have a higher value than the maximum transmission gear ratio that can be set by the continuously variable transmission section 10.

The third clutch mechanism $C_3$ is provided between the stepped transmission section 40 and the output shaft 12 and is configured to selectively couple the driven gear 45 and the output shaft 12. That is, the third clutch mechanism $C_3$ can selectively perform the transmission or the blockage of the torque between the stepped transmission section 40 and the output shaft 12. That is, actuation of the third clutch mechanism $C_3$ is controlled by the control device 1, and the third clutch mechanism $C_3$ is included in the disconnect mechanism in the invention. Accordingly, the first clutch mechanism $C_1$ that is provided on the input shaft 7 side and the third clutch mechanism $C_3$ that is provided on the output shaft 12 side are included as the disconnect mechanism C for disconnecting the stepped transmission section 40 from the input shaft 7 or the output shaft 12.

As described above, in this specified example, the first clutch mechanism $C_1$ is constructed of the friction clutch. Accordingly, the third clutch mechanism $C_3$ may have a configuration for switching between two states of an engaged state and a disengaged state between the driven gear 45 and the output shaft 12, and the transmission torque capacity thereof does not have to have a value between 0% and 100%. For example, the third clutch mechanism $C_3$ can be constructed of a meshing clutch such as a dog clutch or a synchromesh mechanism. FIG. 2 shows an example in which the third clutch mechanism $C_3$ is constructed of the synchromesh mechanism for coupling the driven gear 45 to the output shaft 12 by fitting a sleeve 53 to both of a clutch gear 55 that is configured to integrally rotate with the driven gear 45 and a hub 51 that is configured to integrally rotate with the output shaft 12. That is, the third clutch mechanism $C_3$ in this specified example is a rotation synchronizing device. Accordingly, the third clutch mechanism $C_3$ is configured to set rotational speeds of the output shaft 12 as a rotation member on a synchronizing side and the driven gear 45 as a rotation member on a synchronized side to be equal by the friction force. In addition, the third clutch mechanism $C_3$ is configured that actuation thereof is controlled by the control device 1. More specifically, an appropriate actuator (not shown) for moving the sleeve 53 in the axial direction is provided, and it is configured to electrically control actuation of the actuator by the control device 1.

In addition, it is configured to output the torque from the output shaft 12 to a front differential 16 as a final speed reducer via a reduction gear mechanism 14. More specifically, an output gear 13 is attached to the output shaft 12 in a manner to integrally rotate therewith, and a large diameter gear 14a that meshes with this output gear 13 is attached to a reduction gear shaft 14b. A small diameter gear 14c is attached to this reduction gear shaft 14b, and this small diameter gear 14c meshes with a ring gear 15 of the front differential 16. Then, the front differential 16 is configured to transmit the torque, which is transmitted via the ring gear 15, from the right and left axles 4 to the drive wheels 5.

Figure 4:
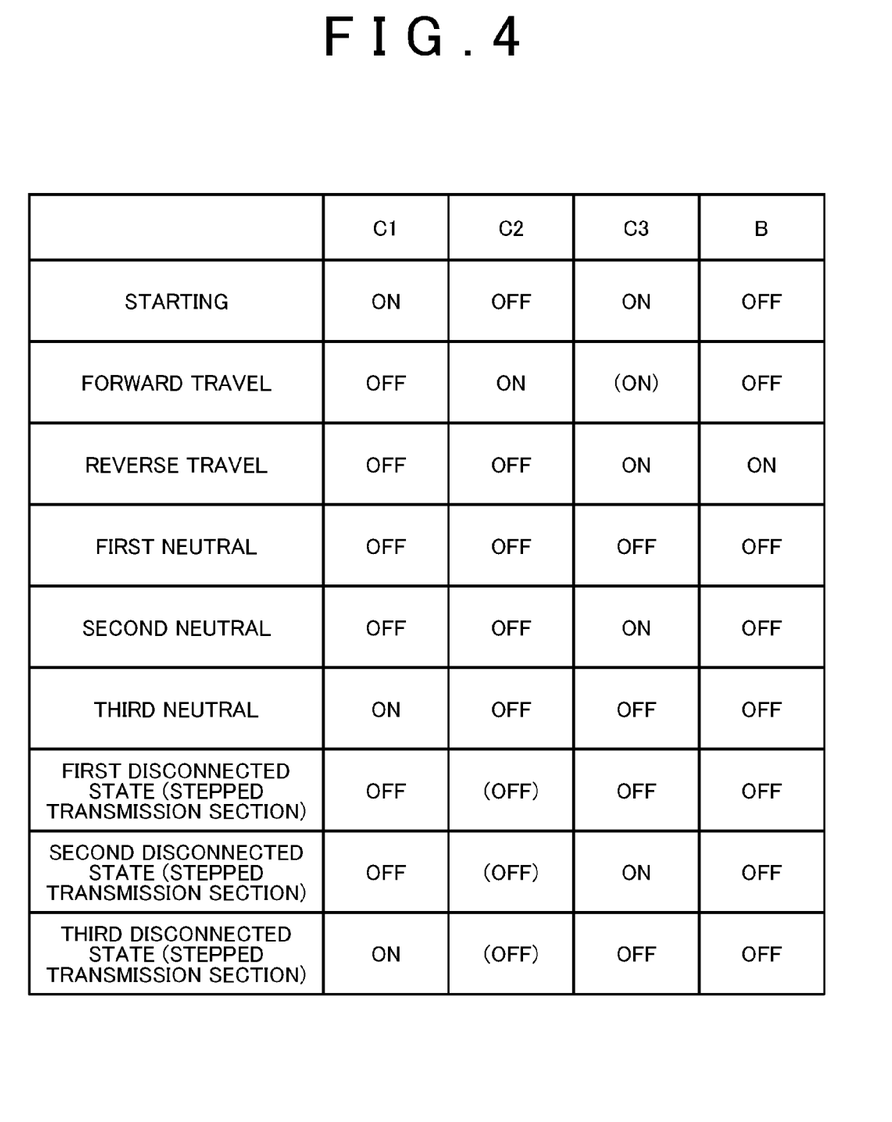
FIG. 4 is a table that collectively shows states where each clutch mechanism and a brake mechanism are engaged or disengaged in accordance with a travel state or a stop state of the vehicle.

The transaxle 3 that is configured as described above is configured to switch between the transmission path including the continuously variable transmission section 10 and the transmission path including the stepped transmission section 40 by switching control by the control device 1. More specifically, it is configured that the torque is transmitted from the input shaft 7 to the output shaft 12 via the transmission path including the stepped transmission section 40 in the case of a start in a forward travel direction and in the case of a reverse travel, and it is configured that the torque is transmitted from the input shaft 7 to the output shaft 12 via the transmission path including the continuously variable transmission section 10 in the case of a forward travel at the vehicle speed V that is increased to a certain degree. For example, when a drive position (a drive range) is selected by an unillustrated shift device or shift lever, the control device 1 engages the first clutch mechanism $C_1$ with the third clutch mechanism $C_3$ and disengages the second clutch mechanism $C_2$ from the brake mechanism B. Furthermore, the transaxle 3 is controlled by the control device 1 so as to be brought into a neutral state where the torque transmission path between the engine 2 and the drive wheels 5 is blocked. For example, the third clutch mechanism $C_3$ is disengaged or engaged in a state where the first clutch mechanism $C_1$, the second clutch mechanism $C_2$, and the brake mechanism B are disengaged. In FIG. 4, the engaged states and the disengaged states of each of the clutch mechanisms $C_1$, $C_2$, $C_3$ and the brake mechanism B are collectively shown in a table. In addition, "ON" described in FIG. 4 indicates being engaged, and "OFF" indicates being disengaged. Furthermore, "ON" in a parenthesis indicates being transiently brought into the engaged state.

When the vehicle starts in the forward travel direction, each of the clutch mechanisms $C_1$, $C_2$, $C_3$ and the brake mechanism B are set as shown in FIG. 4. In this way, the travel state where the torque is transmitted from the input shaft 7 to the output shaft 12 via the transmission path including the stepped transmission section 40 is set. More specifically, since the first clutch mechanism $C_1$ is engaged, the torque transmission path is connected between the input shaft 7 and the stepped transmission section 40, and the torque output by the engine 2 is transmitted to the stepped transmission section 40 via the input shaft 7 and the forward/reverse travel switching mechanism 8. Since the two rotation elements of the forward/reverse travel switching mechanism 8 are coupled by the first clutch mechanism $C_1$, the entire forward/reverse travel switching mechanism 8 rotates integrally. Accordingly, the forward/reverse travel switching mechanism 8 does not generate a speed increasing action or the speed reducing action but transmits the torque input from the input shaft 7 to the drive gear 41 of the stepped transmission section 40. In addition, since the third clutch mechanism $C_3$ is engaged, the torque transmission path is connected between the stepped transmission section 40 and the output shaft 12, and the torque of the input shaft 7 is transmitted to the output shaft 12 via the stepped transmission section 40. Furthermore, since the second clutch mechanism $C_2$ is disengaged, the disengagement prevents the transmission of the torque between the secondary pulley 30 and the output shaft 12. It should be noted that, in a case where an acceleration request is made during a travel at the relatively low vehicle speed V, it may be configured that each of the clutch mechanisms $C_1$, $C_2$, $C_3$ and the brake mechanism B are set in a similar manner to the starting state shown in FIG. 4. It is because high drive power is required.

In a case where the speed is reduced in the travel state where the torque is transmitted via the stepped transmission section 40, the second clutch mechanism $C_2$ is disengaged, and thus the transmission of the torque between the output shaft 12 and the secondary pulley 30 is blocked. Accordingly, while so-called reverse input torque acts from the drive wheels 5 to the output shaft 12, the reverse input torque does not act on the secondary pulley 30. That is, the torque from the drive wheels 5 is not applied to the continuously variable transmission section 10. As a result, the torque that is unnecessarily applied to the continuously variable transmission section 10 is reduced, and the unnecessary rotation thereof is suppressed. Thus, durability of the continuously variable transmission section 10 can be improved.

In a case where the vehicle speed V is increased to a predetermined specified vehicle speed $V_1$ after the vehicle starts in the forward travel direction, the control device 1 controls to switch from the travel state where the torque is transmitted via the transmission path including the stepped transmission section 40 to the travel state where the torque is transmitted via the transmission path including the continuously variable transmission section 10. For example, in a state where the transmission gear ratio by the continuously variable transmission section 10 is set to the maximum transmission gear ratio or a transmission gear ratio near the maximum transmission gear ratio, the engaged first clutch mechanism $C_1$ is disengaged, and the disengaged second clutch mechanism $C_2$ is engaged. More specifically, since the first clutch mechanism $C_1$ is further disengaged in a state where the brake mechanism B is disengaged, the forward/reverse travel switching mechanism 8 is brought into a so-called freely rotating state. As a result, the coupling between the input shaft 7 and the stepped transmission section 40 is cancelled. Meanwhile, since the second clutch mechanism $C_2$ is engaged, the secondary pulley 30 is coupled to the output shaft 12. Just as described, it is configured that the torque of the input shaft 7 is transmitted to the output shaft 12 via the continuously variable transmission section 10. In addition, in the travel state where the torque is transmitted via the transmission path including the continuously variable transmission section 10, the transmission gear ratio by the continuously variable transmission section 10 is gradually lowered, or the transmission gear ratio thereby is varied in accordance with the vehicle speed V and the accelerator operation amount Acc. In this way, the engine speed can be set to a speed with the excellent fuel economy.

In a case where a torque transmission state via the stepped transmission section 40 is switched to a torque transmission state via the continuously variable transmission section 10, just as described, the transmission gear ratio by the stepped transmission section 40 is higher than the maximum transmission gear ratio by the continuously variable transmission section 10. Thus, the transmission gear ratio or the drive power is changed. For this reason, in a case where the first clutch mechanism $C_1$ is disengaged and the second clutch mechanism $C_2$ is engaged, the control device 1 is configured to transiently execute slip control of these clutch mechanisms $C_1$, $C_2$. More specifically, engagement pressure of the second clutch mechanism $C_2$ is gradually increased so as to gradually increase the transmission torque capacity thereof, and in conjunction with this, engagement pressure of the first clutch mechanism $C_1$ is gradually decreased so as to gradually reduce the transmission torque capacity of the first clutch mechanism $C_1$. This control is control that has conventionally been known as clutch-to-clutch control. The torque of the output shaft 12 is smoothly changed by the configuration just as described. Thus, it is possible to avoid or suppress generation of a gear shift shock or a sense of discomfort.

Then, it may be configured that the third clutch mechanism $C_3$ is disengaged after the first clutch mechanism $C_1$ is completely disengaged, the second clutch mechanism $C_2$ is completely engaged, and thus a state where the torque is stably transmitted via the continuously variable transmission section 10 is set. In the travel state where the continuously variable transmission section 10 is used, the first clutch mechanism $C_1$ has already been disengaged, and thus the torque from the input shaft 7 is not applied to the stepped transmission section 40. Accordingly, the third clutch mechanism $C_3$ that is constructed of the meshing clutch can be disengaged. In other words, in the case of the forward travel by using the continuously variable transmission section 10, the third clutch mechanism $C_3$ may be in the engaged state or in the disengaged state. Thus, in a case where the torque is transmitted via the continuously variable transmission section 10, the control device 1 is configured to control an engaging operation or a disengaging operation of the third clutch mechanism $C_3$ in accordance with the travel state, such as a case where a specified condition is established.

For example, in a case where the third clutch mechanism $C_3$ is disengaged during the travel by using the continuously variable transmission section 10, the stepped transmission section 40 is disconnected from the input shaft 7 and the output shaft 12. As a result, the output shaft 12 does not cause the rotation of the stepped transmission section 40. Accordingly, power loss by the stepped transmission section 40 can be reduced, and deterioration of durability of the stepped transmission section 40 can be suppressed. Furthermore, noise and a vibration that are generated by the rotation of the stepped transmission section 40 can be suppressed. In addition, the torque from the input shaft 7 is transmitted to the sun gear $8s$ in the forward/reverse travel switching mechanism 8. At this time, the ring gear $8r$ and the carrier $8c$ are in the freely rotating state. Accordingly, a difference in rotational speed among the rotation elements is decreased due to the integral rotation as a whole and the like. Thus, power loss and deterioration of durability of the forward/reverse travel switching mechanism 8, or generation of noise or a vibration thereby can be suppressed.

In addition, in the case of the reverse travel, the travel state where the torque is transmitted via the stepped transmission section 40 is set. As shown in FIG. 4, the first clutch mechanism $C_1$ and the second clutch mechanism $C_2$ are disengaged, and the third clutch mechanism $C_3$ and the brake mechanism B are engaged. In this case, since the torque from the engine 2 is input to the sun gear $8s$ in a state where the ring gear $8r$ is fixed by the brake mechanism B in the forward/reverse travel switching mechanism 8, the carrier $8c$ rotates in the opposite direction with respect to the sun gear $8s$. Accordingly, the torque is transmitted from the input shaft 7 to the output shaft 12 via the stepped transmission section 40, and the output shaft 12 rotates in a direction to produce the reverse travel.

Furthermore, the control device 1 is configured to be able to set the neutral state by controlling the actuation of each of the clutch mechanisms $C_1$, $C_2$, $C_3$ and the brake mechanism B. That is, the neutral state only has to be a state where the torque transmission path between the engine 2 and the drive wheels 5 is blocked. In this specified example, since the continuously variable transmission section 10 and the stepped transmission section 40 are provided in parallel between the input shaft 7 and the output shaft 12, a neutral state includes a state where the transmission of the torque between the continuously variable transmission section 10 and the output shaft 12 is blocked and the transmission of the torque between at least one rotational shaft of the input shaft 7 and the output shaft 12 and the stepped transmission section 40 is blocked. That is, the neutral state can be set by combinations of the disengaged states and the engaged states of each of the clutch mechanisms $C_1$, $C_2$, $C_3$ and the brake mechanism B. Combination examples for setting the neutral state are shown in FIG. 4.

As shown in FIG. 4, a first neutral state is set by disengaging each of the clutch mechanisms $C_1$, $C_2$, $C_3$ and the brake mechanism B. That is, in the first neutral state, the transmission of the torque between the input shaft 7 and the stepped transmission section 40 is blocked, and the transmission of the torque between the continuously variable transmission section 10 and the stepped transmission section 40 is blocked. Accordingly, neither the torque output from the engine 2 nor the torque from the drive wheels 5 is transmitted to the stepped transmission section 40.

A second neutral state is set by disengaging the first and second clutch mechanisms $C_1$, $C_2$ and the brake mechanism B and engaging the third clutch mechanism $C_3$. Accordingly, while being decoupled from the input shaft 7, the stepped transmission section 40 is coupled to the output shaft 12. That is, in the second neutral state, in the transmission path including the stepped transmission section 40, the torque transmission path between the input shaft 7 and the stepped transmission section 40 is blocked, and the torque transmission path between the stepped transmission section 40 and the output shaft 12 is connected. For example, in a case where the vehicle Ve is towed in the second neutral state, the torque from the drive wheels 5 is blocked so as not to be transmitted to the input shaft 7 and the continuously variable transmission section 10 but is transmitted to the stepped transmission section 40 via the engaged third clutch mechanism $C_3$.

A third neutral state is set by disengaging the second and third clutch mechanisms $C_2$, $C_3$ and the brake mechanism B and engaging the first clutch mechanism $C_1$. Accordingly, while being decoupled from the output shaft 12, the stepped transmission section 40 is coupled to the input shaft 7. That is, in the third neutral state, in the transmission path including the stepped transmission section 40, the torque transmission path between the input shaft 7 and the stepped transmission section 40 is connected, and the torque transmission path between the stepped transmission section 40 and the output shaft 12 is blocked. For example, in a case where the vehicle Ve is towed in the third neutral state, the torque from the drive wheels 5 is not transmitted to the continuously variable transmission section 10 and the stepped transmission section 40.

For example, the control device 1 is configured to execute control for setting any of the above-described neutral states when detecting that the ignition switch 61 as the main switch is in the OFF state (the ignition OFF). More specifically, the control device 1 may be configured to be able to execute control for setting either the first or third neutral state by disengaging the third clutch mechanism $C_3$ when detecting that the engine 2 is stopped and the ignition switch 61 is in the OFF state in the state where the third clutch mechanism $C_3$ is engaged. Alternatively, the control device 1 may be configured to be able to execute control for setting the first neutral state when detecting that the engine 2 is stopped and the ignition switch 61 is in the OFF state in the state where the third clutch mechanism $C_3$ is disengaged.

Here, by referring to FIG. 4, a detailed description will be made on a case where a state where the transmission of the torque between at least one of the input shaft 7 and the output shaft 12 and the stepped transmission section 40 is blocked is only satisfied. As shown in FIG. 4, in a state (a first disconnected state) where the transmission of the torque is blocked between the stepped transmission section 40 and each of the input shaft 7 and the output shaft 12, a state where the first and third clutch mechanisms $C_1$, $C_3$ and the brake mechanism B are disengaged and the second clutch mechanism $C_2$ is engaged or a state where the first and third clutch mechanisms $C_1$, $C_3$ and the brake mechanism B are disengaged and the second clutch mechanism $C_2$ is also disengaged may be set. It should be noted that "OFF" in the parenthesis described in FIG. 4 indicates the mechanism may be in either the engaged state or the disengaged state. For example, in a case where the second clutch mechanism $C_2$ is engaged in the first disconnected state, the vehicle Ve can be controlled in such a travel state where the torque is transmitted via the continuously variable transmission section 10. Meanwhile, in a case where the second clutch mechanism $C_2$ is disengaged in the first disconnected state, the vehicle Ve is brought into a similar state to the above-described first neutral state. Accordingly, in the first disconnected state, the rotation of the stepped transmission section 40 that is caused by the torque of the input shaft 7 and the output shaft 12 can be prevented.

As shown in FIG. 4, in a state (a second disconnected state) where the transmission of the torque is blocked only between the stepped transmission section 40 and the input shaft 7, a state where the first clutch mechanism $C_1$ and the brake mechanism B are disengaged and the second and third clutch mechanisms $C_2$, $C_3$ are engaged or a state where the first and second clutch mechanisms $C_1$, $C_2$ and the brake mechanism B are disengaged and the third clutch mechanism $C_3$ is engaged may be set. For example, in a case where the second clutch mechanism $C_2$ is engaged in the second disconnected state, the vehicle Ve can be controlled in such a travel state where the torque is transmitted via the continuously variable transmission section 10. In this case, since the output shaft 12 and the stepped transmission section 40 are coupled in a manner capable of transmitting the torque, the stepped transmission section 40 rotates by the torque of the output shaft 12. Meanwhile, in a case where the second clutch mechanism $C_2$ is disengaged in the second disconnected state, the vehicle Ve is brought into a similar state to the above-described second neutral state.

In addition, as shown in FIG. 4, in a state (a third disconnected state) where the transmission of the torque is blocked only between the stepped transmission section 40 and the output shaft 12, a state where the third clutch mechanism $C_3$ and the brake mechanism B are disengaged and the first and second clutch mechanisms $C_1$, $C_2$ are engaged or a state where the second and third clutch mechanisms $C_2$, $C_3$ and the brake mechanism B are disengaged and the first clutch mechanism $C_1$ is engaged may be set. For example, in a case where the second clutch mechanism $C_2$ is engaged in the third disconnected state, the vehicle Ve can be controlled in such a travel state where the torque is transmitted via the continuously variable transmission section 10. In this case, since the input shaft 7 and the stepped transmission section 40 are coupled in a manner capable of transmitting the torque, the stepped transmission section 40 rotates by the torque of the input shaft 7. Meanwhile, in a case where the second clutch mechanism $C_2$ is disengaged in the third disconnected state, the vehicle Ve is brought into a similar state to the above-described third neutral state. Accordingly, the second clutch mechanism $C_2$ may be in either the engaged state or the disengaged state in the state where the stepped transmission section 40 is disconnected from at least one rotational shaft of the input shaft 7 and the output shaft 12.

Furthermore, the electronic control unit (ECU) is configured to execute the S&S control for stopping the engine 2 in accordance with the travel state or the stop state of the vehicle Ve. It should be noted that the state where the engine 2 is stopped includes a state where the engine 2 does not output the drive torque. For example, a control state where the electronic throttle valve is controlled to be closed and air intake into the engine 2 is thereby blocked is included.

In this specified example, the control device 1 is configured to execute control for setting the above-described second neutral state or second disconnected state when executing the S&S control. The S&S control is executed, and the control device 1 executes the control for setting the second neutral state or the second disconnected state in a case where a specified condition representing any of the following cases is established: for example, in a case where the vehicle Ve stops by following a traffic signal; in a case where the depression of the accelerator pedal is cancelled by the driver and the speed of the vehicle Ve is reduced; in a case where the depression of the accelerator pedal is cancelled in a state where the vehicle Ve runs at the certain vehicle speed V or higher (hereinafter described as a free-running state); in a case where the driver depresses a brake pedal and the speed of the vehicle Ve is thus reduced; and the like. When the S&S control is executed, there is a case where the ignition switch 61 is in the ON state and thereafter the vehicle Ve starts running or accelerates again due to the operation by the driver. Accordingly, the control is executed for setting the second neutral state or the second disconnected state, in which the third clutch mechanism $C_3$ is engaged, in order to prepare for the case of the startup or re-acceleration. In this way, responsiveness of the drive power during the startup or the re-acceleration can be improved.

In addition, a cause of the stop of the engine 2 is not limited to the case where the S&S control is executed but also includes a stop state of the engine 2 that is not based on an engine stop operation by the driver, a case where control for stopping the engine 2 is executed in the free-running state, and the like. The stop state of the engine 2 that is not based on the engine stop operation includes an engine stall that is the stop of the engine 2 unintended by the driver. Meanwhile, requested drive power that is computed on the basis of the vehicle speed V and the accelerator operation amount Acc is reduced by canceling the depression of the accelerator pedal or the like in a case where the vehicle speed V is high to a certain degree. Accordingly, the engine stop control in the free-running state includes the control for stopping the engine 2 for a purpose of improving the fuel economy. That is, the control for stopping the engine 2 in the travel state where the output torque (the drive torque) from the engine 2 is not required is included. Thus, the control device 1 is configured to be able to control the actuation of the third clutch mechanism $C_3$ for either the case where the control is executed to set the second neutral state or the second disconnected state or the case where the control is executed to set the first or third neutral state, in accordance with the cause of the stop of the engine 2. For example, when the engine of the vehicle Ve stalls, the control is executed by the control device 1 to set the first neutral state. That is, when the engine 2 is stopped by the engine stall, the actuation of each of the clutch mechanisms $C_1$, $C_2$, $C_3$ and the brake mechanism B are controlled to cause the disengagement thereof by the control device 1.

As described above, each of the clutch mechanisms $C_1$, $C_2$, $C_3$ and the brake mechanism B have a function of switching the torque transmission path between the engine 2 and the drive wheels 5, that is, both of a function of connecting or blocking the torque transmission path between the continuously variable transmission section 10 and the drive wheels 5 and a function of connecting or blocking the torque transmission path between the stepped transmission section 40 and the engine 2 or the drive wheels 5. In other words, it is configured to be able to block the torque transmission path between at least one of the continuously variable transmission section 10 and the stepped transmission section 40 and the drive wheels 5 by the control device 1. In view of this, one example in which the control device 1 controls the actuation of the third clutch mechanism $C_3$ for connecting or blocking the torque transmission path between the stepped transmission section 40 and the output shaft 12 in accordance with the travel state or the stop state of the vehicle Ve is shown in FIG. 3.

Figure 3:
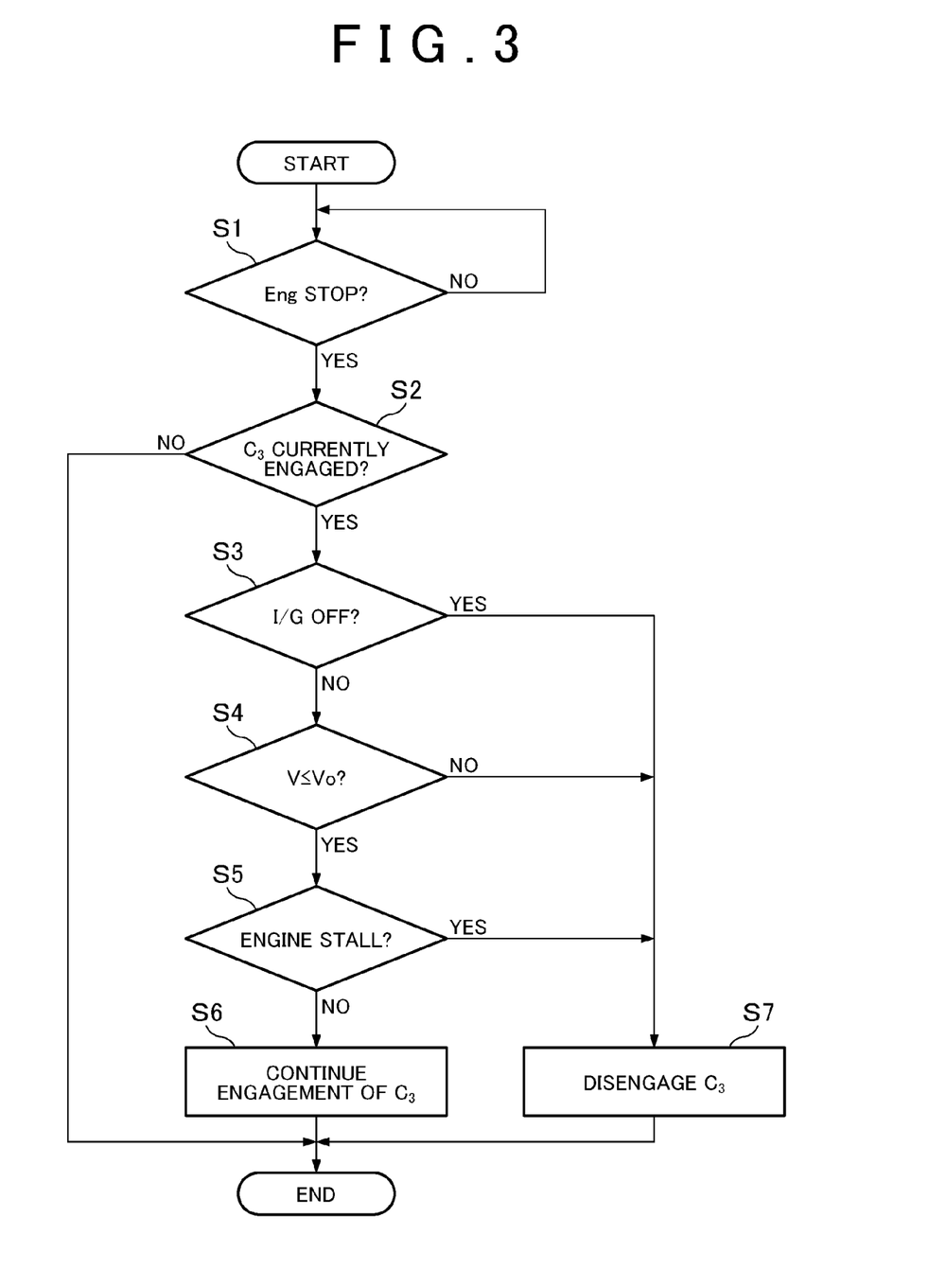
FIG. 3 is a flowchart of a control flow for engaging or disengaging a clutch mechanism that is provided between the stepped transmission section and an output shaft.

As shown in FIG. 3, the control device 1 determines whether the engine 2 that has been driven is stopped (step S1). A case where the engine 2 is stopped includes a case where the engine 2 is stopped when the driver operates the ignition switch 61 to be in the OFF state, a case where the engine 2 is stopped in the ON state of the ignition switch 61 due to the execution of the S&S control, and a case where the engine 2 is stopped by the engine stall. Then, if the engine 2 is driven, the process returns, and determination processing in step S1 is repeated.

If a positive determination is made in step S1 due to the stop of the engine 2, the control device 1 determines whether the third clutch mechanism $C_3$ is currently engaged (step S2). For example, the control device 1 is configured to determine the engaged state or the disengaged state of the third clutch mechanism $C_3$ by determining whether the sleeve 53 in the third clutch mechanism $C_3$, which is constructed of the meshing clutch, is in a position at which the sleeve 53 is spline-fitted to the hub 51 and the clutch gear 55 or in a neutral position. If a negative determination is made in step S2 due to the disengagement of the third clutch mechanism $C_3$, the current control processing is terminated.

On the other hand, if a positive determination is made in step S2 due to the engagement of the third clutch mechanism $C_3$, the control device 1 determines whether the ignition switch 61 is in the OFF state (I/G—OFF) (step S3). In the processing in this step S3, for example, in a case where the vehicle Ve is the vehicle Ve that is activated when an ignition key is inserted in a key cylinder and is rotated to a specified position, the control device 1 is configured to determine whether a position of the rotated ignition key (a key position) is a position at which the engine 2 is continuously driven. Alternatively, in a case where the vehicle Ve has a function referred to as so-called keyless entry or smart entry, the control device 1 is configured to determine whether the ignition switch 61 as the main switch of the vehicle Ve is in the OFF state. Accordingly, the control device 1 is configured to determine whether the ignition switch 61 is in the ON state or the OFF state on the basis of the ignition signal. If a positive determination is made in this step S3 due to the OFF state of the ignition switch 61, the control device 1 outputs a command signal for disengaging the third clutch mechanism $C_3$ (step S7) and terminates the current control processing.

If a negative determination is made in step S3 due to the ON state of the ignition switch 61, the control device 1 determines whether the vehicle speed V is at most equal to a predetermined specified vehicle speed (a reference vehicle speed) $V_0$ (step S4). The reference vehicle speed $V_0$ includes a vehicle speed in a case where the vehicle Ve performs so-called coasting. That is, it is configured in this step S4 whether the vehicle Ve travels at a relatively low vehicle speed is determined by the control device 1. In addition, the control device 1 is configured to detect the vehicle speed V, which is input from the vehicle speed sensor 62, and execute the determination processing in step S4. If the vehicle speed V is higher than the reference vehicle speed $V_0$ and thus a negative determination is made in step S4, the control device 1 outputs the command signal for disengaging the third clutch mechanism $C_3$ (step S7) and terminates the current control processing. A case where the vehicle speed V is higher than the reference vehicle speed $V_0$, which is determined in step S4, includes the free-running state. This free-running state is a state where the depression of the accelerator pedal by the driver is cancelled, and the vehicle Ve may have to be accelerated again by the operation of the driver thereafter. Since the vehicle speed V is a relatively high vehicle speed during the re-acceleration, the drive power that is required for the re-acceleration is relatively reduced. Thus, if the negative determination is made in step S4, it may be configured to output a command signal for engaging the second clutch mechanism $C_2$ or a command signal for maintaining the engaged state of the second clutch mechanism $C_2$ in addition to the output of the command signal for disengaging the third clutch mechanism $C_3$. That is, it is configured to accelerate by using the continuously variable transmission section 10 during the re-acceleration from the free-running state.

If the vehicle speed V is at most equal to the reference vehicle speed $V_0$ and thus a positive determination is made in step S4, the control device 1 determines whether the cause of the stop of the engine 2 is the engine stall (step S5). That is, the control device 1 is configured to determine whether the stop state of the engine 2 that is unintended by the driver occurs in step S5. For example, the cause of the stop of the engine 2 includes a case where the driver intentionally stops the engine 2 by operating the ignition switch 61, a case where the engine 2 is stopped due to the execution of the S&S control, or the stop state of the engine 2 that is unintended by the driver, that is, a case of the engine stall. For example, the control device 1 is configured to make a negative determination in step S5 when detecting the S&S signal indicating that the S&S control is currently executed and detecting the stop of the engine 2. In addition, the control device 1 is configured to make a positive determination in step S5 when detecting the stop of the engine 2 in a case where the ignition signal indicating that the ignition switch 61 is in the ON state is detected but the S&S signal indicating that the S&S control is currently executed is not detected. That is, the control device 1 may be configured that the process proceeds to step S6 in a case where the S&S signal indicating that the S&S control is currently executed is detected in this step S5 and that the process proceeds to step S7 in a case where the S&S signal indicating that the S&S control is currently executed is not detected. Then, if the engine 2 is stopped due to the engine stall or the S&S signal indicating that the S&S control is currently executed is not detected, and thus the positive determination is made in this step S5, the control device 1 outputs the command signal for disengaging the third clutch mechanism $C_3$ (step S7) and terminates the current control processing.

On the other hand, if it is determined that the engine 2 is stopped due to a cause other than the engine stall, in other words, the S&S signal indicating that the S&S control is currently executed is detected, the control device 1 outputs a command signal for maintaining the engagement of the third clutch mechanism $C_3$ (step S6) and terminates the current control processing. A case where the negative determination is made in step S5 includes a case where the above-described S&S control is executed. Thus, in a case where the accelerator pedal is depressed by the driver even when the S&S control is executed in the state where the depression of the accelerator pedal by the driver is cancelled, the vehicle has to be started or accelerated again. Accordingly, it is configured to output the command signal for maintaining the engaged state of the third clutch mechanism $C_3$ in order to prepare for the case where the vehicle Ve is started or accelerated again. That is, in a case where the vehicle is resumed from the S&S control and is accelerated again due to the depression of the accelerator pedal by the driver, it is configured to accelerate by using the stepped transmission section 40. In addition, in a case where the engagement of the third clutch mechanism $C_3$ is maintained by this step S6, the second clutch mechanism $C_2$ may be in either the engaged state or the disengaged state. That is, it is configured to set the above-described second disconnected state by the control in step S6. Furthermore, the negative determination is made in step S3. Thus, in a case where the negative determination is made in step S5, the case where the driver intentionally stops the engine 2 by operating the ignition switch 61 is not included.

It should be noted that the control device 1 may be configured to output the command signal for disengaging the third clutch mechanism $C_3$ in the control in above-described step S7, that is, output the command signal for setting any state of the above-described first neutral state, third neutral state, first disconnected state, and third disconnected state. That is, in a case where the third clutch mechanism $C_3$ is disengaged by the control in step S7, the second clutch mechanism $C_2$ may be in either the disengaged state or the engaged state.

Here, a brief description will be made on a relationship between the above-described specified example and the invention. The third clutch mechanism $C_3$ corresponds to the clutch mechanism in the invention. In addition, control means in step 6 that is described by referring to FIG. 3 corresponds to engagement maintaining means, and control means in step S7 corresponds to disengagement instructing means.

As described above, according to the control device for a vehicle according to the invention, it is possible to control the disengaging operation or the maintenance of the engagement of the third clutch mechanism that is provided between the stepped transmission section and the output shaft in accordance with the travel state or the stop state of the vehicle. For example, during the travel of the vehicle, in particular, during free running, coasting after the engine stall, or the like, the torque transmission path between the stepped transmission section including a gear train and the output shaft can be blocked by disengaging the third clutch mechanism. Accordingly, the rotation of the gear mechanism that constitutes the stepped transmission section by the output shaft can be prevented. Thus, rotation loss by the stepped transmission section can be suppressed. Furthermore, the transmission of the so-called reverse input torque from the drive wheels to the stepped transmission section can be prevented during the speed reduction. Accordingly, the stepped transmission section that is brought into the unlubricated state by the stop of the engine can be prevented from being actuated by the reverse input torque. Thus, the durability of the stepped transmission section can be improved. That is, the durability of the stepped transmission section can be improved by reducing the torque that is unnecessarily applied to the stepped transmission section and suppressing the unnecessary rotation thereof. In addition, the transmission of the reverse input torque to the engine via the stepped transmission section can be prevented.

Moreover, the transmission path including the stepped transmission section and the transmission path including the continuously variable transmission section are provided in parallel. Accordingly, in a case where the continuously variable transmission section and the drive wheels are mechanically connected and the vehicle is accelerated again in a state where the vehicle speed is high to a certain degree even when the stepped transmission section is mechanically disconnected from the drive wheels, the vehicle can be accelerated by using the transmission path including the continuously variable transmission section.

In addition, in the case of the engine stall or in a case where the ignition switch is in the OFF state, a situation where the vehicle is towed is considered. Thus, the third clutch mechanism can be disengaged to prepare for the towed state. That is, it is configured to be able to set the neutral state that includes the state where the third clutch mechanism is disengaged. Accordingly, since the engine is stopped during towing of the vehicle, the application of the torque from the drive wheels to the stepped transmission section that is brought into the unlubricated state can be prevented. Thus, the torque that is unnecessarily applied to the stepped transmission section can be reduced, and the unnecessary rotation of the stepped transmission section can be suppressed. Therefore, the durability of the stepped transmission section can be improved.

Meanwhile, in a case where the S&S control is executed while the vehicle is stopped or while the vehicle runs at the relatively low vehicle speed, the torque transmission path between the stepped transmission section and the output shaft can continuously be connected by maintaining the engagement of the third clutch mechanism. Accordingly, the third clutch mechanism does not have to be actuated for the engagement in a case where the vehicle is accelerated again from the low vehicle speed state or the vehicle is started after the engine is stopped by the S&S control. Thus, the responsiveness can be improved. That is, in a case where the relatively high drive power is required during the start or the re-acceleration, the delayed generation of the drive power in the drive wheels with respect to the requested power can be prevented. In other words, the transmission gear ratio by the stepped transmission section is set to be higher than the transmission gear ratio by the continuously variable transmission section. Thus, the torque transmission path between the engine and the drive wheels can be switched in accordance with the travel state or the stop state of the vehicle.

It should be noted that the control device for a vehicle according to the invention is not limited to the each above-described specified example but can appropriately be modified within a scope that does not depart from the purpose of the invention.

For example, it may be configured that the first clutch mechanism can be actuated by the hydraulic pressure of the accumulator even in a case where the first clutch mechanism and the second clutch mechanism, each of which is constructed of the friction clutch, include the hydraulic actuator and the accumulator, and the engine is stopped. That is, it may be configured that the first and second clutch mechanisms can be actuated regardless of the driven state or the stop state of the engine.

In addition, in the invention, an electronic control unit (an engine ECU) for controlling the driving or the stop of the engine may be provided, in addition to the control device in the above-described specified example. It may be configured that the S&S signal is input from the engine ECU to the control device for a vehicle according to the invention. As the detection signals that are input to the control device, the detection signals of a turbine rotational speed, an input shaft rotational speed, a primary shaft rotational speed, a primary pulley groove width, a secondary pulley groove width, a secondary shaft rotational speed, an output shaft rotational speed, the hydraulic pressure of the first clutch mechanism, the hydraulic pressure of the second clutch mechanism, and the like are included. Furthermore, these detection signals may be input from various sensors, which are not shown, to the control device.

Moreover, the forward/reverse travel switching mechanism in the invention can be constructed of a planetary gear unit of a single pinion type, instead of the above-described planetary gear unit of the double pinion type. In addition, the first clutch mechanism is used to integrate the entire forward/reverse travel switching mechanism that performs the differential action. Thus, as described in the each above-described specified example, a configuration in which the three rotation elements of the sun gear, the carrier, and the ring gear are coupled may be adopted, instead of the configuration in which the two rotation elements of the sun gear and the carrier are coupled to each other.

In addition, the third clutch mechanism in the invention may be constructed of a synchromesh mechanism of a key type or a synchromesh mechanism of a cone type. That is, the third clutch mechanism only has to be the meshing-type clutch, and may be constructed of a synchromesh mechanism of a single cone type or a synchromesh mechanism of a multi cone type.

Furthermore, the stepped transmission section in the invention is not limited to the gear mechanism that includes one transmission gear ratio (the gear ratio, the speed reduction ratio) as the fixed transmission gear ratio, but may be a gear mechanism that has two or more of the plural fixed transmission gear ratios (the gear ratios, the speed reduction ratios) and can select and set any of these fixed transmission gear ratios. That is, the stepped transmission section only has to be constructed of the gear mechanism that can transmit the torque from the input shaft to the output shaft. In the invention, since the transmission gear ratio that cannot be set by the continuously variable transmission section is set as the fixed transmission gear ratio by the stepped transmission section, the gear mechanism is constructed of the combination of the gear pairs in which plural gears mesh with each other. In other words, it only has to be configured that the gear ratio of these (the ratio of the number of tooth) becomes a higher transmission gear ratio than the maximum transmission gear ratio that can be set by the continuously variable transmission section.

DESCRIPTION OF THE REFERENCE NUMERALS AND SYMBOLS

1/CONTROL DEVICE (ECU)
2/ENGINE
3/TRANSAXLE
4/AXLE
5/DRIVE WHEEL
7/INPUT SHAFT
8/FORWARD/REVERSE TRAVEL SWITCHING MECHANISM
9/PRIMARY SHAFT
10/CONTINUOUSLY VARIABLE TRANSMISSION SECTION
10a/BELT
11/OUTPUT SHAFT
13/OUTPUT GEAR
14/REDUCTION GEAR MECHANISM
16/FRONT DIFFERENTIAL
20/PRIMARY PULLEY
30/SECONDARY PULLEY
40/STEPPED TRANSMISSION SECTION
41/DRIVE GEAR
42/COUNTER DRIVEN GEAR
43/COUNTER SHAFT
44/COUNTER DRIVE GEAR
45/DRIVEN GEAR
51/HUB
53/SLEEVE
55/CLUTCH GEAR
61/IGNITION SWITCH
62/VEHICLE SPEED SENSOR
B/BRAKE MECHANISM
C/DISCONNECT MECHANISM
$C_1$/FIRST CLUTCH MECHANISM

C₂/SECOND CLUTCH MECHANISM
C₃/THIRD CLUTCH MECHANISM

What is claimed is:

1. A control system for a vehicle, the vehicle including an engine, an input shaft, an output shaft, a continuously variable transmission section, a stepped transmission section and a clutch mechanism, the input shaft being configured that torque output from the engine is input, the output shaft being configured to output the torque, the continuously variable transmission section being configured to continuously vary a transmission gear ratio, the stepped transmission section being provided in parallel with the continuously variable transmission section and capable of setting a transmission gear ratio that cannot be set by said continuously variable transmission section, the continuously variable transmission section and the stepped transmission section being provided between the input shaft and the output shaft, and the clutch mechanism being provided in a torque transmission path between the stepped transmission section and drive wheels, the control system comprising:
a control device configured to disengage the clutch mechanism, in a case where a vehicle speed is at least equal to a specified value and the engine is stopped.

2. The control system according to claim 1, wherein the control device is configured to disengage the clutch mechanism, in a case where the vehicle speed is lower than the specified value and the engine is stopped due to an engine stall or ignition OFF.

3. The control system according to claim 1, wherein the control device is configured to maintain engagement of the clutch mechanism, in a case where the vehicle speed is lower than the specified value and the engine is stopped due to execution of stop and start control.

4. A control method for a vehicle, the vehicle including an engine, an input shaft, an output shaft, a continuously variable transmission section, a stepped transmission section, a clutch mechanism, and a control device, the input shaft being configured that torque output from the engine is input, the output shaft being configured to output the torque, the continuously variable transmission section being configured to continuously vary a transmission gear ratio, the stepped transmission section being provided in parallel with the continuously variable transmission section and capable of setting a transmission gear ratio that cannot be set by the continuously variable transmission section, the continuously variable transmission section and the stepped transmission section being provided between the input shaft and the output shaft, and the clutch mechanism being provided in a torque transmission path between the stepped transmission section and drive wheels, the control method comprising:
disengaging the clutch mechanism, by the control device, in a case where it is determined that a vehicle speed is at least equal to a specified value and in a case where the engine is stopped.

5. The control method according to claim 4, wherein the clutch mechanism is disengaged by the control device, in a case where the control device determines that the vehicle speed is lower than the specified value and the engine is stopped due to an engine stall.

6. The control method according to claim 4, wherein engagement of the clutch mechanism is maintained by the control device, in a case where the control device determines that the vehicle speed is lower than the specified value and the engine is stopped due to execution of stop and start control.

* * * * *